United States Patent
Malatesta et al.

[11] 3,919,131
[45] *Nov. 11, 1975

[54] PERHALOGENATED CO-BUTYL RUBBER

[75] Inventors: Alberto Malatesta, Brussels, Belgium; Francis P. Baldwin, Summit, N.J.

[73] Assignee: Exxon Research and Engineering Company, Linden, N.J.

[ * ] Notice: The portion of the term of this patent subsequent to June 11, 1991, has been disclaimed.

[22] Filed: Dec. 22, 1972

[21] Appl. No.: 317,716

[52] U.S. Cl. ........... 260/5; 260/79.5 C; 260/85.3 H; 260/846; 260/847; 260/888
[51] Int. Cl.² ............ C08C 19/14; C08L 7/00; C08L 9/00; C08L 15/02
[58] Field of Search ............ 260/85.3 C, 85.3 H, 5, 260/79.5 C, 846, 847, 888

[56] References Cited
UNITED STATES PATENTS

| | | | |
|---|---|---|---|
| 3,084,142 | 4/1963 | Cottle et al. | 260/85.3 H |
| 3,646,166 | 2/1972 | Canter et al. | 260/85.3 H |
| 3,712,360 | 1/1973 | Torti et al. | 260/85.3 H |
| 3,816,371 | 6/1974 | Baldwin et al. | 260/85.3 R |
| 3,852,253 | 12/1974 | Malatesta | 260/85.3 C |
| 3,867,270 | 2/1975 | Malatesta et al. | 260/85.3 C |

OTHER PUBLICATIONS
Encyclopedia of Polymer Science and Technology, Vol. 2, pp. 762–763 & 777–785, Interscience, New York (1965).

*Primary Examiner*—Alan Holler

[57] ABSTRACT

Disclosed is a perhalogenated butyl rubber prepared by halogenating a butyl rubber having conjugated double bonds, a major portion of which are in the linear backbone. Also disclosed is a method for producing the perhalogenated composition comprising halogenating the conjugated diene containing butyl rubber, in the dark, at a temperature of from 0° to 75°C., followed by recovery of perhalogenated butyl rubber by the usual recovery and finishing procedures known to the art. The novel composition of the invention may be represented by the equation:

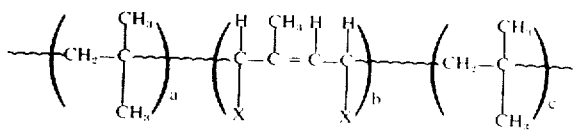

where $a + c$ represent the number of isoolefin units incorporated in the butyl rubber backbone, and $b$ represents the number of perhalogenated diolefin units present, substantially as randomly distributed units and X is halogen.

50 Claims, No Drawings

PERHALOGENATED CO-BUTYL RUBBER

BACKGROUND OF THE INVENTION

1. Field of the Invention

The present invention relates to a novel, halogenated butyl rubber and a process for preparing same. More particularly, the invention relates to perhalogenated butyl rubber and its method of preparation.

2. Description of the Prior Art

The expression "butyl rubber" is used in the rubber industry to describe copolymers made from a polymerization reaction mixture having therein from 70 to 99.5% by weight of an isoolefin which has about 4 to 7 carbon atoms, e.g., isobutylene, and about 30 to 0.5% by weight of a conjugated multiolefin having from about 4 to 14 carbon atoms, e.g., isoprene. The resulting copolymers contain 85 to 99.5% by weight of combined isoolefin and about 0.5 to 15% of combined multiolefin. The preparation of butyl rubber is described in U.S. Pat. No. 2,356,128, which is incorporated herein by reference.

The polymer backbone of commercial butyl rubber is made up primarily of isobutylene units, with just a few percent is isoprene units. The isoprene units contribute the small amount of unsaturation present in butyl rubber. The basic preparative equations are represented by:

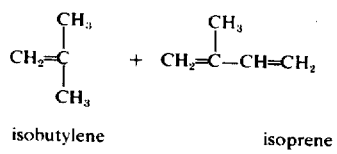

isobutylene             isoprene which combine to form:

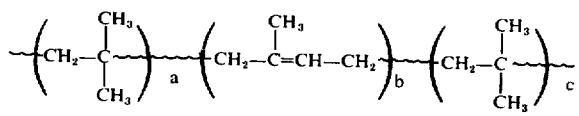

where $a + c$ represent the number of isoolefin units incorporated in the butyl rubber, while $b$ represents the number of diolefin units present, substantially as randomly distributed units. The conjugated olefin loses its diene unsaturation upon its incorporation into the polymer backbone.

Thus, butyl rubber, as presently produced, contains only a small percentage of unsaturation, in the form of the single double bond associated with the isoprene residue which is incorporated more or less randomly throughout the polymer chain.

Halogenated butyl rubber has been developed in recent years and has contributed significantly to the elastomer business. A method of preparing halogenated butyl rubber is described in U.S. Pat. 3,099,644, which is incorporated herein by reference. Both chlorinated and brominated butyl rubber are known in the art. The formula for halogenated butyl rubber is schematically typified by:

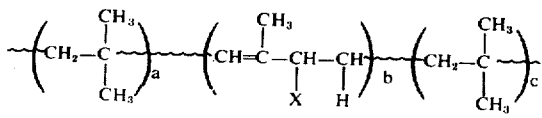

where $a$, $b$ and $c$ have the same values as for butyl rubber, described above, though this structure is but one of several which can be formed, depending on the conditions of halogenation, the halogenating agent used, etc.

In copending applications for United States Letters Patent, the present applicants describe a novel conjugated diene containing butyl rubber, where substantially all of the conjugated diene unsaturation is present in the linear polymer backbone. These applications are Ser. No. 228,728, filed Feb. 23, 1972 (Francis P. Baldwin) now U.S. Pat. No. 3,775,387; Ser. No. 228,727, filed Feb. 23, 1972 (Francis P. Baldwin and Alberto Malatesta); and Ser. No. 317,715, filed Dec. 22, 1972 (Alberto Malatesta), which is filed concurrently with the present application; all of which are incorporated herein by reference.

These applications further teach several processes for preparing the conjugated diene containing butyl rubber (sometimes referred to hereinafter as CDB). There are two principal methods of preparing CDB. These are:

I. A semi-homogeneous process comprising contacting a solution of halogenated butyl rubber with certain soluble metal carboxylate salts, soluble carboxylic acid along with an oxide or hydroxide of a Group Ia or IIa metal; and II. A heterogeneous process which, in essence, comprises contacting a solution of halogenated butyl rubber with a strong acid salt of a Group IIa or IIb metal.

Both processes have been found to give high yields of conjugated diene containing butyl rubber, the precursor to the products of this invention.

These, and other advantages are more fully illustrated in the following specification and examples.

SUMMARY OF THE INVENTION

A novel, halogenated butyl rubber has been discovered comprising a perhalogenated copolymer consisting of from 85 to 99.5% by weight of an isoolefin having from 4 to 7 carbon atoms, combined with 15 to 0.5% by weight of a conjugated diolefin having from about 4 to 14 carbon atoms, and having a formula which may be represented by:

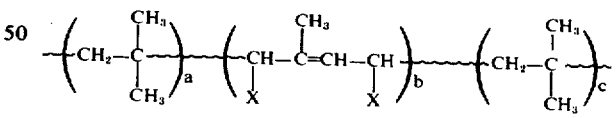

where $a + c$ represent the number of isoolefin units incorporated in the butyl rubber backbone, $b$ represents the number of perhalogenated diolefin units present, substantially as randomly inserted units, and X is any halogen.

The composition may be prepared by dehydrohalogenation of a halogenated butyl rubber, followed by hologenation of the dehydrohalogenated product. The halogenation and dehydrohalogenation steps may be "continuous", i.e., in a continuous operation commencing with the dehydrohalogenation and ending with recovery of the perhalogenated product; or, they may be independent operations at separate sites.

DESCRIPTION OF THE PREFERRED EMBODIMENTS

In simplified terms, the process of the present invention comprises dehydrohalogenation of halogenated butyl rubber, to produce a butyl rubber of reduced halogen content and which has conjugated diene groups more or less randomly inserted along the linear backbone of the butyl rubber. The conjugated diene is believed to be produced in the diolefin moieties of the chain, e.g., in commercial butyl rubber, occurring in the isoprene segments. This conjugated diene containing butyl rubber, in a hydrocarbon solvent, in the dark, is contacted with a halogenating agent at a temperature of between −20° to 75°C. The final product is predominantly a combination of isoolefin and halogen containing olefin units represented by the formula:

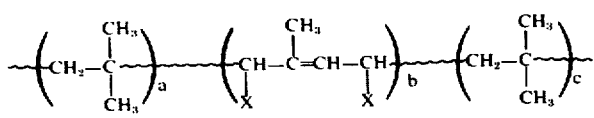

where $a + c$ represent the number of isoolefin units incorporated in the butyl rubber backbone, $b$ representing the number of perhalogenated diolefin units present, substantially as randomly inserted units, and X is halogen.

Halogenated butyl rubber is commercially available and may be prepared by halogenating butyl rubber in a solution containing 1 to 60% by weight butyl rubber in a substantially inert $C_5$-$C_8$ hydrocarbon solvent such as pentane, hexane, heptane, etc. and contacting this butyl rubber cement with an elemental halogen for a period of about 2–25 minutes. There is then formed the halogenated butyl rubber and a hydrogen halide, the copolymer containing up to one or somewhat more, especially in the case of bromine, halogen atom per double bond initially present in the copolymer. This invention is not intended to be limited in any way by the manner in which butyl rubber is halogenated, and both chlorinated and brominated butyl rubbers are suitable for use in this invention.

Illustrative of halogenated butyl rubber is Enjay Butyl HT 1068 (a chlorinated butyl rubber prepared from a butyl rubber having ~1.8 mole % unsaturation and a viscosity-average molecular weight of 450,000 or above). However, for the purposes of this invention, it is preferred that the butyl rubber starting material having incorporated therein from about 0.3 to 5 mole % of combined diolefin, more preferably 0.5 to 3 mole %, e.g., about 2 mole %.

Butyl rubber generally has a number average molecular weight of about 5,000 to about 500,000, preferably about 80,000 to about 250,000, especially about 100,000 to about 200,000 and a Wijs Iodine No. of about 0.5 to 50, preferably 1 to 15.

Dehydrohalogenation is a known chemical reaction and reagents commonly used are listed, for example, on p. 1308 of "Reagents for Organic Synthesis" by Louis F. and Mary Fieser (John Wiley and Sons, Inc., New York, 1967). Among these are for example t-butylamine, N,N-dimethylformamide, calcium carbonate, potassium t-butoxide, sodium iodide in 1,2-dimethoxyethane etc.

These methods and reagents have been employed with low molecular weight materials where homogeneous contacting of the material to be dehydrohalogenated with the dehydrohalogenating reagent is effected at high concentration, where compound and reagent solubilization can be effected by the use of polar solvents, e.g., dimethylsulfoxide, ethanol, diethyl ether, etc.

In high polymers where the halogen is present in the polymer only in small percentage, where the polymer is not soluble in polar solvents and where the concentration of the halogen containing polymer is limited by the high viscosity of polymer solutions in solvents, these methods of dehydrohalogenation are not suitable for producing the compositions of present invention. Moreover, even in the case where the dehydrohalogenating reagent is hydrocarbon soluble, undesirable side reactions occur, which prevent suitable formation of the products of this invention.

For example, dehydrohalogenation by tertiary amines can be considered conventional. The side reaction here is the formation of quaternary salts as in reaction 1

(1) 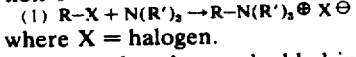

where X = halogen.

These salts when embedded in a medium of low dielectric constant (i.e., the polymer itself) lead to associated ionomeric complexes. In a high polymer this manifests itself in pseudo crosslinking leading to enormous increases in viscosity and gelation.

In summary then the most effective conventional reagents are insoluble in the systems of concern, and the soluble conventional reagents give undesirable side reactions.

The dehydrohalogenation methods employed in forming the precursor for the perhalogenated product of this invention, overcome the above disadvantages and provide a conjugated diene containing butyl rubber, which is subsequently halogenated to obtain the final product of the invention. One process is "heterogeneous," while the other process is "semi-homogeneous."

The heterogeneous process comprises contacting a solution of halogenated butyl rubber with a strong acid salt selected from the group consisting of phosphate, sulfate, chloride and nitrate, of a metal selected from a Group IIa or IIb metal, at a temperature of from 100° to 220°C. The term "strong acid salt," as used in the specification and claims means salts of strong acids. Typical of the metals of Groups IIa and IIb of the Periodic Table are calcium and zinc. This heterogeneous process is fully taught in U.S. application for Letters Patent, Ser. No. 317,715, filed Dec. 22, 1972, which has been filed concurrently with the present application.

A particularly advantageous semi-homogeneous method of preparing the conjugated diene containing polymers comprises heating a solution of the halogenated polymer in the presence of a soluble metal carboxylate. Suitable metals are the polyvalent metals of Groups Ib, IIb, IVa and VIII, of the Periodic Table, having a relatively high first ionization potential and whose halides are soluble in the hydrocarbon reaction medium at the reaction temperature. Typical of these are zinc, iron, mercury, nickel, cobalt, copper, tin and cadmium carboxylates.

The halogenated butyl rubber is first dissolved in a suitable organic solvent such as a $C_5$-$C_8$ substantially inert hydrocarbon, such as pentane, hexane, heptane, mineral spirits, cyclohexane, toluene, benzene, xylene, and mixtures thereof. To the halogenated butyl rubber solution is added the metal carboxylate, carboxylic acid and the oxide or hydroxide of the Group Ia or IIa metal. The reactor containing these ingredients is then heated, usually at a temperature below about 200°C depending upon the particular solvent used and the ceiling temperature below which the polymer is soluble, the residence time and ingredient concentrations present. Generally, the temperature for the reaction will be between 75° and 200°C., although reactions at temperatures above 200°C. are possible for some situations.

The reaction period may be for a period of time ranging from 0.1 to 24 hours, depending on composition of the copolymer (i.e., brominated or chlorinated), concentration of the ingredients present in the reaction zone, the level or degree of dehydrohalogenation desired, temperature, or any combination of these variables. Preferably, the time for essentially complete conversion to the conjugated diene product is from about 0.1 to about 3 hours.

Especially useful are the soluble carboxylic acid salts of zinc (e.g., zinc salts of naphthenic acids). While useful in preparing the compositions of the present invention, potential toxicity problems which could be encountered in practicing the present invention might limit the use of metals, such as cadmium and mercury salts, for example and the soluble carboxylates of iron, nickel and copper, for example, are known to be catalysts for oxidation.

Zinc carboxylate is the most preferred reagent in the present invention. However, in dehydrohalogenating the halogenated butyl rubber, according to the present invention, zinc chloride is thought to be a by-product in the reaction. Zinc chloride, being an effective Friedel-Crafts type catalyst, may lead to molecular weight degradation or crosslinking of the halogenated polymers, depending on the structure of the polymer, solvent medium employed, etc.

This difficulty is overcome, in the present invention, by having present in the reaction zone a metal oxide, hydroxide or carboxylate whose halogen salt is insoluble in the reaction medium. These are generally the oxides, hydroxide and/or carboxylate of the metals of Groups Ia and IIa. Most suitable of these are calcium and magnesium. Most preferred is calcium.

For example, although not wishing to be bound thereby, it is thought that the production of the conjugated diene containing butyl proceeds by the following series of reactions (Zn is used to represent the metals of Groups Ib, IIb, IVa and VIII):

i. Dehydrohalogenation by Zinc Carboxylate

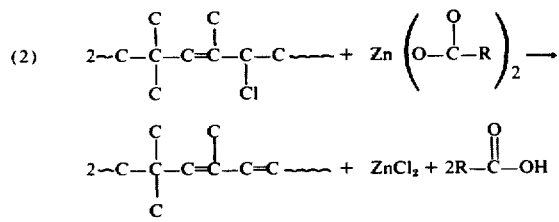

ii. Generation of Alkali or Alkaline Earth Carboxylate

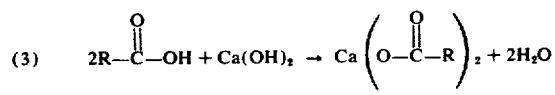

iii. Regeneration of Zinc Carboxylate and Elimination of Zinc Halide

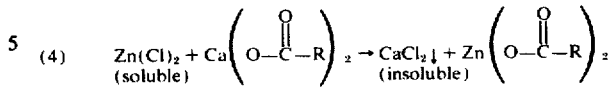

Thus, by this series of reactions the zinc carboxylate, effective in dehydrohalogenation, perhaps by a concerted 6-membered ring mechanism route as depicted below:

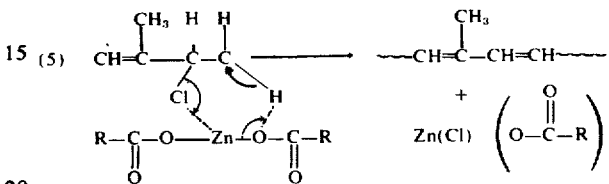

can be regenerated, the net overall reaction in terms of transformation of materials being

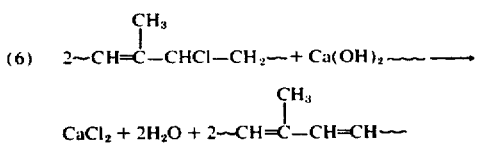

It has also been observed that reaction 2 (or 5) does not occur exclusively. In such reactions there is thought to be competition between the elimination and the substitution routes, the former producing the conjugated diene containing polymer, the latter an allylic ester containing polymer as indicated below:

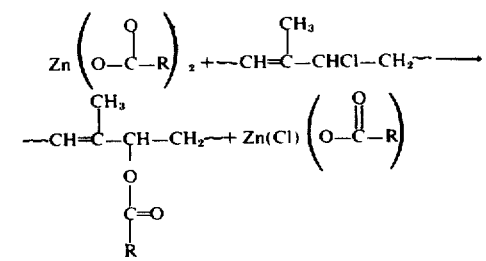

For the purpose of this invention, reaction 7 must be repressed.

The relative participation of reactions 2 (or 5) and 7 can be adjusted by the solvent medium used, the temperature at which the reaction is run and other factors known to alter the competition between elimination and substitution reactions. The exact nature of the allylic halide present in the polymer will also influence the relative extent of the two reactions under a given set of conditions. Not all of the factors governing the ratio of the reactions effected can be set forth, but, that the balance can be affected is illustrated in some of the examples in Ser. No. 228,727, previously incorporated herein by reference.

It has been found that the mole percent of conjugated diene unsaturation, in the intermediate products of this invention, run from about 0.5 to about 2.5. The mole percent of allylic ester is generally from about 0.1 to 0.25.

The predominant structure of the conjugated diene-containing butyl rubber, produced by the process of the invention, is thought to be

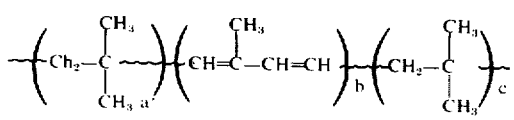

where $a$, $b$ and $c$ have the values previously described, though other structures may be present. When the starting halobutyl is a chlorinated butyl rubber, the above structure is thought to dominate. However, there may be some randomly inserted conjugated diene units having the general configuration:

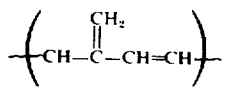

The present invention includes both structures, since their presence depends primarily on the structure of starting polymer, but also, to a lesser extent, on the process conditions employed for dehydrohalogenation.

Suitable carboxylic acids, useful in the present invention are the $C_5$ to $C_{13}$ monocarboxylic acids known as Neo Acids (Exxon Chemical Co.), which are trialkyl acetic acids, e.g., Neo-pentanoic acid; Neo-heptanoic acid; Neo-decanoic acid; and mixtures of the trialkyl acetic acids having 5 to 13 carbon atoms. Other monocarboxylic acids useful in the invention are the aliphatic and naphthenic carboxylic acids having about 4 to 20 carbon atoms, and ring-substituted aromatic carboxylic acids. One of the most preferred is naphthenic acid. The salt and acid, used in this method, generally are but need not be the same, e.g., if the naphthenate of a Group IIb metal is used, it would usually be used in conjunction with some free naphthenic acid or Group IIa naphthenate.

While it is believed that virtually any carboxylic acid would be suitable in the present invention, to be used with the metals of Groups Ib, IIb, IVa and VIII of the Periodic Table, the acid should be chosen so that the metal salt is soluble in the hydrocarbon solvent used to dissolve the polymer and at the reaction temperature employed.

Preferably then, the carboxylic acids should be of such nature that the formation of crystallites of the metal salt is unlikely, or if crystallites are formed, they have relatively low heats of fusion, or high entropies of fusion, therefore low melting points.

This method of producing conjugated diene butyl (sometimes referred to herein as CDB) provides for removal of up to 90%, and more, of the halogen present in the halogenated butyl rubber being converted.

The CDB thus produced may then be recovered from solution, such as by precipitation in acetone or some other suitable polar material, e.g., alcohol, or by solvent stripping with steam and hot water, and subsequent drying. This eliminates catalyst and other reaction products that may be harmful to the subsequent halogenation step.

If this intermediate step of recovering the CDB is used, the CDB is redissolved in any of the suitable solvents named above. Typically, the CDB is redissolved in the same solvent used in preparing the CDB since it would simplify solvent storage and use in the overall process.

The redissolved CDB is then halogenated with either a solution of halogen in a hydrocarbon solvent or is contacted with the halogen per se, whether liquid or gas. It has been found that chlorine and bromine are the most suitable halogens for preparing the perhalogenated butyl. However, other halogens are suitable for this purpose. Also, interhalogen compounds may be used, such as Cl-Br or I-Cl and the like.

If liquid bromine is used, it may be used in its original liquid form, or diluted with a hydrocarbon solvent. It is somewhat easier to control the rate of reaction if the halogen is first dissolved in a solvent, typically the solvent used for the reaction medium.

For complete conversion, it is preferred to use a slight, excess amount of halogen above the stoichiometric amount required to perhalogenate the CDB. The overall rate of reaction is controlled by the rate of introduction of the particular halogenating agent chosen. A feed level of 1.05 moles of elemental halogen per mole of conjugated diene present in the solution of elastomer hydrocarbon is suitable. However, in some cases it would be desirable to effect only fractional conversion to the perhalogen modification in which case the level of halogen introduced would be less.

The perhalogenation reaction is conducted at a temperature of from about $-20°$ to $75°C.$, preferably from $20°$ to about $40°C.$ The perhalogenation step is usually conducted at atmospheric pressure or above. Normally, the reaction proceeds rapidly, and pressure is not needed to regulate reaction rates, only to permit processing (pumping, etc).

It is preferred to conduct the reaction in the dark. Consequently, a closed reaction system is recommended. Typical reactors used in preparing polymers comprise such closed, reaction vessels.

The perhalogenated butyl rubber is recovered by sweeping the rubber-solvent cement with inert gas in order to eliminate all unreacted halogen and hydrogen halide present in the reaction product, washing the solution with water or caustic solution, etc.

The product is then precipitated with acetone or an alcohol, e.g., methanol, or in a commercial recovery process stripped with steam under partial vacuum. The precipitated (wet) perhalogenated rubber is dried and finished according to well-known procedures.

The perhalogenated butyl rubber of this invention may be cured by a variety of methods, such as quinone dioxime and its esters, as well as phenol-aldehyde resins. These are merely well known examples. Others will be apparent to those skilled in the art.

The sulfur-containing curing agents are known in the art, and along with sulfur, are useful in curing the compositions produced by this invention.

The perhalogenated compositions may also be covulcanized with other general purpose rubbers. Most suitable are the high unsaturation rubbers, such as natural rubber, SBR (a butadiene-styrene rubber known formerly as GR-S) and the like. The amount of high unsaturation rubber that can be blended with the conjugated diene rubber of this invention is from 10 to 90 weight percent.

A more complete understanding of the present invention can be obtained by reference to the following examples.

EXAMPLES 1–4

Five g. of conjugated diene butyl rubber of a viscosity average molecular weight of 440,000 and containing 1.35% of conjugated double bonds were dissolved in 85 ml of benzene. The solution was introduced together with 5 mg of a substituted phenolic antioxidant in a reaction flask fitted with stirrer, gas outlet and inlet, thermometer and a port closed with a rubber serum cap. The flask was blanketed with nitrogen, and stirred to dissolve the antioxidant and immersed in a water bath at 20°C.

0.26 g. of bromine, diluted with 6 ml. of benzene corresponding to about 5% excess of the theory, was introduced into the flask with a glass syringe through the rubber serum cap in short bursts while stirring. The flask was stirred further for 60 minutes. No noticeable temperature increase was observed.

Nitrogen was blown through the solution for 30 minutes to sweep out all unreacted bromine and HBr. The rubber was recovered quantitatively by double precipitation with MeOH and vacuum dried overnight at room temperature.

Four experiments, as described, were carried out to check the reproducibility of the technique. The results are collected in Table I.

TABLE I

| Experiment No. | 1 | 2 | 3 | 4 |
|---|---|---|---|---|
| Bromine content % | 2.51 | 2.53 | 2.48 | 2.77 |
| Molecular weight | 310,500 | 270,000 | 257,500 | 278,000 |

The results demonstrate that conjugated diene butyl rubber brominates readily with the formation of a perbrominated butyl rubber containing on the average 2 bromine atoms per initial conjugated diene moiety present, probably added to the 1 and 4 position of each conjugated diene unit. The UV spectrum of the brominated rubber is flat in the region 230–250 mm whereas an intense signal is visible when the starting rubber is scanned.

EXAMPLES 5–6

Addition of chlorine to conjugated diene butyl rubber was performed following the technique described in Examples 1–4 and using the same amount of conjugated diene butyl rubber of the same viscosity average molecular weight and conjugated diene content.

Three cubic centimeters of gaseous chlorine corresponding to about 10% excess of the theory, were introduced into the flask with a calibrated gas syringe through the rubber serum cap over about 15 minutes while stirring. The stirring was continued for 1 hour. No noticeable temperature increase was observed.

The rubber was recovered as previously described.

Two experiments, as described, were carried out and the results are collected in Table II.

TABLE II

| Experiment No. | 5 | 6 |
|---|---|---|
| Chlorine content % | 1.16 | 1.25 |
| Molecular Weight | 315,500 | 290,000 |

The results demonstrate that conjugated diene butyl rubber chlorinates readily with the formation of a perchlorinated butyl rubber containing on the average 2 chlorine atoms for each conjugated diene moiety initially present in the polymer. As in examples 1–4 the UV spectrum of the chlorinated rubber is flat in the region 230–250 mm.

EXAMPLES 7–8

The halogenated elastomers obtained in Examples 1–4 and Examples 5–6 were compounded separately in a small Brabender mixer with 5 phr of ZnO and 1 phr of stearic acid.

The resulting compounds were vulcanized in a mold under pressure at 136°C. for 60 minutes. The vulcanized rubbers were swollen in cyclohexane at room temperature for 24 hours. At equilibrium the samples exhibited swelling ratios shown in Table III.

TABLE III

| | Brominated rubber | Chlorinated Rubber |
|---|---|---|
| Swell ratio[1] | 2.1 | 1.7 |
| Insolubilized rubber[2] | 95.7 | 96.1 |

[1]Swell Ratio—weight of sample + wt. of solvent/wt. of sample
[2]Insolubilized Rubber — determined by drying and reweighing of the swollen sample.

In both cases the perhalogenated butyl rubbers are very tightly cured by ZnO in the presence of stearic acid as the low swell ratios and the high percent of insolubilized polymer indicate.

What is claimed is:

1. A composition of matter consisting essentially of a perhalogenated butyl rubber consisting of a copolymer having from 85 to 99.5% by weight of an isoolefin having from 4 to 7 carbon atoms, combined with 15 to 0.5% by weight of a conjugated diolefin having from 4 to 14 carbon atoms (referred to hereinafter as butyl rubber), containing in the linear backbone substantially randomly inserted diolefin units having residual unsaturation and at least two halogen atoms attached thereto.

2. The composition of claim 1, wherein the isoolefin is isobutylene and the diolefin is isoprene.

3. The composition of claim 2, having a general structure represented by:

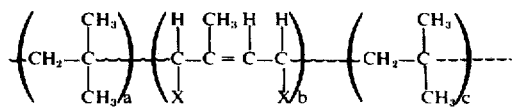

where $a + c$ represent the number of isobutylene units incorporated in the copolymer backbone, and $b$ represents the number of perhalogenated isoprene units present, substantially as randomly inserted units, and X is halogen.

4. The composition of claim 1, wherein the linear backbone additionally contains substantially randomly inserted diolefin units having conjugated diene unsaturation.

5. The composition of claim 2, wherein the linear backbone additionally contains substantially randomly inserted isoprene units having conjugated diene unsaturation.

6. The composition of claim 2, wherein there is combined in the copolymer from about 0.5 to about 3.0 percent by weight perhalogenated isoprene residue, substantially all of said isoprene units having at least two halogens attached thereto.

7. The composition of claim 2, wherein the halogen is chlorine.

8. The composition of claim 2, wherein the halogen is bromine.

9. The composition of claim 2 cured with sulfur or a sulfur-containing curing agent.

10. The composition of claim 2 cured with a phenol-aldehyde resin.

11. The composition of claim 2, blended with from 10 to 90 weight percent of a high unsaturation rubber.

12. The composition of claim 2, covulcanized with from 10 to 90 weight percent of a high unsaturation rubber.

13. The composition of claim 11, wherein the high unsaturation rubber is natural rubber.

14. The composition of claim 11, wherein the high unsaturation rubber is SBR.

15. A process for preparing perhalogenated butyl rubber which comprises:
  a. contacting, in a reaction zone, a solution of halogenated butyl rubber with a suitable catalyst for a time sufficient to dehydrohalogenate said halogenated butyl rubber;
  b. recovering from said reaction zone the dehydrohalogenated butyl rubber, which is characterized by having conjugated diene unsaturation randomly inserted along the backbone of said butyl rubber;
  c. in a second reaction zone, in the absence of light, contacting a solution of said dehydrohalogenated butyl rubber with a halogen, at a temperature of from $-20°$ to $75°C$., at a feed level of 0.2 to 1.1 moles of elemental halogen per mole of conjugated diene moiety present in the dehydrohalogenated butyl rubber solution; and
  d. recovering said perhalogenated butyl rubber.

16. A process for preparing a perhalogenated copolymer consisting of from 85 to 99.5% by weight of an isoolefin having from 4 to 7 carbon atoms, combined with 15 to 0.5% by weight of a conjugated diolefin having from 4 to 14 carbon atoms, containing in the linear backbone substantially randomly inserted diolefin units having residual unsaturation, and at least 2 halogen atoms attached thereto, which comprises,
  A. contacting a solution of halogenated butyl rubber, in a reaction zone with:
    a. from about $2 \times 10^{-3}$ to $2 \times 10^{-2}$ moles of a soluble metal carboxylate per 100 grams of said halogenated butyl rubber, the metals being selected from the metals of Groups Ib, IIb, IVa and VIII of the Periodic Table;
    b. about 0 to 2 moles of a carboxylic acid per gram atom of halogen in the halogenated butyl rubber present in said reaction zone; and
    c. about 0.5 to 2 moles of an oxide, hydroxide or carboxylate of a metal selected from the metals of Groups Ia or IIa of the Periodic Table, per gram atom of halogen in the halogenated butyl rubber present in the reaction zone;
  B. recovering from the reaction zone said butyl rubber, having a reduced halogen content, which is characterized by having a conjugated diene unsaturation randomly inserted along the isoolefin backbone of said butyl rubber;
  C. contacting a solution of said butyl rubber having a reduced halogen content, in a reaction zone, in the absence of light, with a halogenating agent, at a temperature of from $-20°$ to $75°C$., at a feed level of 0.2 to 1.1 moles of elemental halogen per mole of conjugated diene moiety present in the dehydrohalogenated butyl rubber solution; and
  D. recovering said perhalogenated butyl rubber.

17. The process of claim 16, wherein the butyl rubber is a copolymer consisting of from 85 to 99.5% by weight isobutylene, combined with 15 to 0.5% by weight isoprene, having a number average molecular weight of from about 5,000 to 500,000.

18. The process of claim 16, wherein the soluble metal carboxylate is a zinc carboxylate.

19. The process of claim 16, wherein the soluble metal carboxylate is zinc naphthenate.

20. The process of claim 16, wherein the metal of the Group Ia or IIa oxide, hydroxide or carboxylate is calcium.

21. The process of claim 16, wherein the metal of the Group Ia or IIa oxide, hydroxide or carboxylate is magnesium.

22. The process of claim 16, wherein the halogenated butyl rubber is dehydrohalogenated by contacting said halogenated butyl rubber with:
  a. zinc naphthenate;
  b. naphthenic acid; and
  c. calcium oxide.

23. The process of claim 16, wherein the dehydrohalogenation is conducted at a temperature of between about $75°$ and $200°C$., for a period of time to at least partially dehydrohalogenate said halogenated butyl rubber.

24. The process of claim 16, wherein the carboxylic acid is an aliphatic or naphthenic acid having from 4 to 20 carbon atoms.

25. The process of claim 16, wherein the halogenating agent is gaseous chlorine.

26. The process of claim 16, wherein the halogenating agent is bromine.

27. The process of claim 16, wherein the halogenating agent is chlorine or bromine in a solution of the same solvent as the dehydrohalogenated butyl rubber.

28. The process of claim 16, wherein the halogenating agent is in excess of the stoichiometric amount required for perhalogenation of the dehydrohalogenated butyl rubber.

29. A process for preparing perhalogenated butyl rubber which comprises:
  A. contacting a solution of halogenated butyl rubber, in a reaction zone, with a metal salt of a strong acid wherein said metal is selected from the metals of Group IIa or IIb of the Periodic Table, the mole ratio of rubber to metal salt being from 0.1 to 0.5, at a temperature of from $100°$ to $220°C$., for a time sufficient to dehydrohalogenate said halogenated butyl rubber, and said metal salt being other than a Friedel-Crafts catalyst;
  B. recovering from the reaction zone, said butyl rubber having a reduced halogen content, which is characterized by having conjugated diene unsaturation randomly inserted along the isoolefin backbone of said butyl rubber;

C. contacting a solution of said butyl rubber having a reduced halogen content, in a reaction zone, in the absence of light, with a halogenating agent, at a temperature of from −20° to 75°C., at a feed level of 0.2 to 1.1 moles of elemental halogen per mole of conjugated diene moiety present in the dehydrohalogenated butyl rubber solution; and D. recovering said perhalogenated butyl rubber.

30. The process of claim 29 wherein the solution of halogenated butyl rubber is contacted with a hydrocarbon insoluble metal salt of a strong acid wherein said metal is selected from the metals of Group IIa or IIb of the Periodic Table, at a temperature of about 130° to about 180°C., the mole ratio of rubber to metal salt being from about 0.2 to about 0.5.

31. The process of claim 30, wherein the catalyst is a metal salt of a strong acid selected from the group consisting of phosphate, sulfate, chloride and nitrate, of a metal selected from the metals of Groups IIa and IIb of the Periodic Table.

32. The process of claim 30, wherein the Group IIa metal is calcium.

33. The process of claim 30, wherein the Group IIb metal is zinc.

34. The process of claim 30, wherein the metal salt of a strong acid is tricalcium orthophosphate.

35. The process of claim 30, wherein the halogenating agent is gaseous chlorine.

36. The process of claim 30, wherein the halogenating agent is bromine.

37. The process of claim 30, wherein the halogenating agent is chlorine or bromine in a solution of the same solvent as the dehydrohalogenated butyl rubber.

38. The process of claim 30, wherein the halogenating agent is in excess of the stoichiometric amount required for perhalogenation of the dehydrohalogenated butyl rubber.

39. The process of claim 29 wherein the butyl rubber having a reduced halogen content is halogenated in the presence of light.

40. The process of claim 15 wherein the dehydrohalogenated butyl rubber is contacted with a halogen in the presence of light.

41. The process of claim 16, wherein the butyl rubber having a reduced halogen content, is contacted with a halogen in the presence of light.

42. A process for preparing perhalogenated butyl rubber which comprises:

A. contacting a solution of halogenated butyl rubber, in a reaction zone, with a Friedel-Crafts catalyst and a metal oxide, hydroxide or carboxylate of a metal selected from the metals of Group Ia and IIa and wherein the Friedel-Crafts catalyst is a metal salt of a strong acid wherein said metal is selected from the metals of Group IIa or IIb of the Periodic Table of the Elements, the mole ratio of rubber to metal salt being about 0.1 to about 0.5, at a temperature of about 100°C. to about 220°C. for a time sufficient to dehydrogenate said halogenated butyl rubber;

B. recovering from the reaction zone, said butyl rubber having a reduced halogen content, which is characterized by having conjugated diene unsaturation randomly inserted along the isoolefin backbone of said butyl rubber;

C. contacting a solution of said butyl rubber having a reduced halogen content, in a reaction zone, in the absence of light, with a halogenating agent, at a temperature of from −20 to 75°C., at a feed level of 0.2 to 1.1 miles of elemental halogen per mole of conjugated diene moiety present in the dehydrohalogenated butyl rubber solution; and D. recovering said perhalogenated butyl rubber.

43. The process of claim 42 wherein the metal of the metal oxide, hydroxide or carboxylate is calcium.

44. The process of claim 42 wherein the metal of the metal oxide, hydroxide or carboxylate is magnesium.

45. The process of claim 42 wherein the halogenating agent is gaseous chlorine.

46. The process of claim 42 wherein the halogenating agent is bromine.

47. The process of claim 42 wherein the halogenating agent is chlorine or bromine in a solution of the same solvent as the dehydrohalogenating butyl rubber.

48. The process of claim 42 wherein the halogenating agent is in excess of the stoichiometric amount required for perhalogenation of the dehydrohalogenated butyl rubber.

49. The process of claim 42 wherein the butyl rubber having a reduced halogen content is halogenated in the presence of light.

50. The process of claim 42 wherein the dehydrohalogenated butyl rubber is contacted with halogen in the presence of light.

* * * * *